(12) United States Patent
Wu et al.

(10) Patent No.: US 9,188,630 B2
(45) Date of Patent: Nov. 17, 2015

(54) METHOD FOR INSPECTING SHORT-CIRCUIT OF CIRCUIT LAYOUT AND DEVICE USING THE SAME

(75) Inventors: Lin-Jian Wu, New Taipei (TW); Lung-Ming Chan, New Taipei (TW)

(73) Assignee: Wistron Corporation, New Taipei (TW)

( * ) Notice: Subject to any disclaimer, the term of this patent is extended or adjusted under 35 U.S.C. 154(b) by 526 days.

(21) Appl. No.: 13/609,279

(22) Filed: Sep. 11, 2012

(65) Prior Publication Data

US 2013/0325389 A1   Dec. 5, 2013

(30) Foreign Application Priority Data

May 29, 2012  (CN) .......................... 2012 1 0172076

(51) Int. Cl.
*G01R 31/28* (2006.01)
*G06F 19/00* (2011.01)
*G06F 17/50* (2006.01)

(52) U.S. Cl.
CPC ........ *G01R 31/2812* (2013.01); *G06F 17/5045* (2013.01); *G06F 17/5068* (2013.01)

(58) Field of Classification Search
CPC ...... G01R 31/00; G01R 31/2812; G09G 3/00; G06F 11/261; G06F 17/5045; G06F 17/5068; G06F 19/00; G06F 17/50
USPC .......................................................... 702/117
See application file for complete search history.

(56) References Cited

U.S. PATENT DOCUMENTS

| | | | | |
|---|---|---|---|---|
| 5,485,175 A | * | 1/1996 | Suzuki | 715/841 |
| 2006/0225017 A1 | * | 10/2006 | Uchida | 716/12 |
| 2007/0006111 A1 | * | 1/2007 | Otsuka | 716/13 |
| 2008/0254701 A1 | * | 10/2008 | Koshiishi et al. | 445/2 |
| 2009/0007030 A1 | * | 1/2009 | Nehmadi et al. | 716/4 |
| 2012/0114221 A1 | * | 5/2012 | Satou et al. | 382/149 |
| 2012/0216162 A1 | * | 8/2012 | Ku | 716/112 |
| 2012/0297356 A1 | * | 11/2012 | Wu et al. | 716/136 |

FOREIGN PATENT DOCUMENTS

| | | |
|---|---|---|
| TW | 201117030 | 5/2011 |
| TW | 201117030 A * | 5/2011 |

OTHER PUBLICATIONS

Fen et. al, The PCB defect inspection system design based on lab widows/CVI,2009,IEEE, 978-1-4244-3818-1/09,485487.*

(Continued)

*Primary Examiner* — John Breene
*Assistant Examiner* — Mohammad K Islam
(74) *Attorney, Agent, or Firm* — Jianq Chyun IP Office

(57) ABSTRACT

A method for inspecting short-circuit of circuit layout and a device using the same are provided, the method including: obtaining a circuit layout, wherein the circuit layout including a plurality of components; searching at least one of physical short-circuit components on the circuit layout among the components; adjusting the at least one of the physical short-circuit components so as to set the at least one of the physical short-circuit components to an open circuit state; inspecting whether the circuit layout has a short-circuit; and recovering the at least one of the physical short-circuit components to the at least one of the physical short-circuit components before adjustment. Thus, the short-circuit errors needed to be corrected in the circuit layout are detected exactly.

18 Claims, 5 Drawing Sheets

(56) References Cited

OTHER PUBLICATIONS

Pai Chin-Shu, Method of Inspecting Circuit Layout, May 16, 2011, TW, TW201117030A.*

"Office Action of China Counterpart Application", issued on Jun. 3, 2015, with English translation thereof, p. 1-p. 20.
"Office Action of Taiwan Counterpart Application," issued on Jul. 8, 2015, with English translation thereof, p1-p9, in which the listed references were cited.

* cited by examiner

METHOD FOR INSPECTING SHORT-CIRCUIT OF CIRCUIT LAYOUT AND DEVICE USING THE SAME

CROSS-REFERENCE TO RELATED APPLICATION

This application claims the priority benefit of China application serial no. 201210172076.3, filed on May 29, 2012. The entirety of the above-mentioned patent application is hereby incorporated by reference herein and made a part of this specification.

BACKGROUND

1. Technical Field

The disclosure relates to a method for analysing a circuit layout. Particularly, the disclosure relates to a method for inspecting short-circuit of a circuit layout and a device using the same.

2. Related Art

In circuit designs of various circuit boards (for example, printed circuit boards (PCBs)), a designer generally uses a large amount of zero ohm resistors or internal short-circuit components due to a circuit arrange demand or different circuit versions, so as to produce short-circuits in the internal circuit based on characteristics of the zero ohm resistors or the internal short-circuit components.

However, as a large amount of the internal short-circuit components are configured in the PCB, when computer assisted software is used to inspect short-circuit errors on a circuit layout of the PCB, besides non-design required short-circuit errors and undesired short-circuit errors, the inspected short-circuit messages also present the zero ohm resistors or the internal short-circuit components intentionally configured by the designer. Therefore, the designer has to spend extra time to identify the short-circuit errors actually required to be corrected from the inspected short-circuit messages.

FIG. 1 is a schematic diagram of an inspection result obtained by inspecting short-circuit of a circuit layout through short-circuit inspection software. Referring to FIG. 1, after inspecting short-circuit of a circuit layout, a circuit comparison display window 101 generated by the short-circuit inspection software includes an abnormal short-circuit record 111, in which a plurality of short-circuit messages are included. The designer has to spend extra time to compare each of the short-circuit messages with the zero ohm resistors or the internal short-circuit components intentionally configured in the circuit layout one-by-one, so as to find the short-circuit errors actually required to be corrected.

Therefore, how to effectively skip the internal short-circuit components intentionally configured by the designer and quickly find the short-circuit errors actually required to be corrected has become a problem to be resolved.

SUMMARY

Accordingly, the disclosure is directed to a method for inspecting short-circuit of a circuit layout and a device using the same, by which physical short-circuit components configured by a designer are directly skipped, and short-circuit errors required to be corrected in the circuit layout are accurately inspected.

The disclosure provides a method for inspecting short-circuit of a circuit layout, which includes following steps. The circuit layout is obtained, wherein the circuit layout including a plurality of components. At least one physical short-circuit component on the circuit layout is searched among the components. The at least one physical short-circuit component is adjusted to set the at least one physical short-circuit component to an open circuit state. It is inspected whether the circuit layout has a short-circuit. The at least one physical short-circuit component is recovered to the at least one physical short-circuit component before adjustment.

In an embodiment of the disclosure, the circuit layout further includes a circuit pattern layer, and the step of adjusting the at least one physical short-circuit component to set the at least one physical short-circuit component to the open circuit state includes additionally configuring an alternative pattern layer at a corresponding position of the at least one physical short-circuit component in the circuit pattern layer, and merging the circuit pattern layer and the alternative pattern layer of the circuit layout to set the at least one physical short-circuit component to the open circuit state.

In an embodiment of the disclosure, the step of recovering the at least one physical short-circuit component to the at least one physical short-circuit component before adjustment includes separating the circuit pattern layer and the alternative pattern layer, and removing the alternative pattern layer.

In an embodiment of the disclosure, the step of adjusting the at least one physical short-circuit component to set the at least one physical short-circuit component to the open circuit state includes replacing the at least one physical short-circuit component by at least one predetermined open circuit component.

In an embodiment of the disclosure, the step of adjusting the at least one physical short-circuit component to set the at least one physical short-circuit component to the open circuit state includes recording or displaying a corresponding position of the replaced at least one physical short-circuit component in the circuit layout in a netlist.

In an embodiment of the disclosure, the step of recovering the at least one physical short-circuit component to the at least one physical short-circuit component before adjustment includes replacing the at least one predetermined open circuit component in the circuit layout by the original at least one physical short-circuit component according to the netlist.

In an embodiment of the disclosure, the step of inspecting whether the circuit layout has the short-circuit includes recording and displaying at least one short-circuit position where the short-circuit occurs when the circuit layout is inspected to have the short-circuit.

In an embodiment of the disclosure, the step of inspecting whether the circuit layout has the short-circuit includes correcting a circuit of the circuit layout according to the at least one short-circuit position.

In an embodiment of the disclosure, the circuit layout is used to produce a circuit board, where the circuit board is a printed circuit board or a flexible printed circuit board.

The disclosure provides a short-circuit inspection device for a circuit layout, which includes a layout module, a search module, an adjustment module, an inspection module and a recovery module. The layout module obtains the circuit layout, where the circuit layout includes a plurality of components. The search module is connected to the layout module, and searches at least one physical short-circuit component on the circuit layout among the components. The adjustment module is connected to the search module, and adjusts the at least one physical short-circuit component to set the at least one physical short-circuit component to an open circuit state. The inspection module is connected to the layout module and the adjustment module, and inspects whether the circuit layout has a short-circuit. The recovery module is connected to the adjustment module, and recovers the at least one physical short-circuit component to the at least one physical short-circuit component before adjustment.

In an embodiment of the disclosure, the circuit layout further includes a circuit pattern layer, and the adjustment module additionally configures an alternative pattern layer at a corresponding position of the at least one physical short-circuit component in the circuit pattern layer, and merges the circuit pattern layer and the alternative pattern layer of the circuit layout to set the at least one physical short-circuit component to the open circuit state.

In an embodiment of the disclosure, the recovery module separates the circuit pattern layer and the alternative pattern layer, and removes the alternative pattern layer.

In an embodiment of the disclosure, the adjustment module replaces the at least one physical short-circuit component by at least one predetermined open circuit component.

In an embodiment of the disclosure, the adjustment module records or displays a corresponding position of the replaced at least one physical short-circuit component in the circuit layout in a netlist.

In an embodiment of the disclosure, the recovery module replaces the at least one predetermined open circuit component in the circuit layout by the original at least one physical short-circuit component according to the netlist.

In an embodiment of the disclosure, when the circuit layout is inspected to have the short-circuit, the inspection module records and displays at least one short-circuit position where the short-circuit occurs.

In an embodiment of the disclosure, the inspection module corrects a circuit of the circuit layout according to the at least one short-circuit position.

According to the above descriptions, the disclosure provides a method for inspecting short-circuit of a circuit layout and a device using the same, by which the physical short-circuit components on the obtained circuit layout is searched, and the physical short-circuit components are adjusted to the open circuit state, so that when it is inspected whether the circuit layout has the short-circuit, the physical short-circuit components are directly skipped, and only non-designed short-circuit errors are inspected. After the inspection, the adjusted physical short-circuit components are recovered to the physical short-circuit components before the adjustment. In this way, the abnormal short-circuit messages inspected through the short-circuit inspection procedure do not include the physical short-circuit components intentionally configured by the designer, so that efficiency and accuracy in short-circuit inspection are greatly improved.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

In order to ensure computer assisted software or a related circuit inspection procedure to effectively skip internal short-circuit components intentionally configured by a designer, and quickly find short-circuit errors actually required to be corrected to reduce a working procedure of the designer, an embodiment of the disclosure provides a method for inspecting short-circuit of a circuit layout, by which a physical short-circuit component in the circuit layout is detected and set to an open circuit state according to a design requirement, and then a short-circuit inspection is performed on the circuit layout. After the short-circuit inspection is completed, the physical short-circuit component is recovered to the physical short-circuit component before adjustment. In this way, when the short-circuit inspection procedure is performed on the circuit layout having a large number of components or a complicated circuit, short-circuit messages that are intentionally configured by the designer can be removed, so that the designer can effectively correct the actual short-circuit errors. Moreover, the disclosure also provides a short-circuit inspection device using the aforementioned short-circuit inspection method. In order to fully convey the spirit of the disclosure, embodiments are provided below for detail description.

Figure 2:
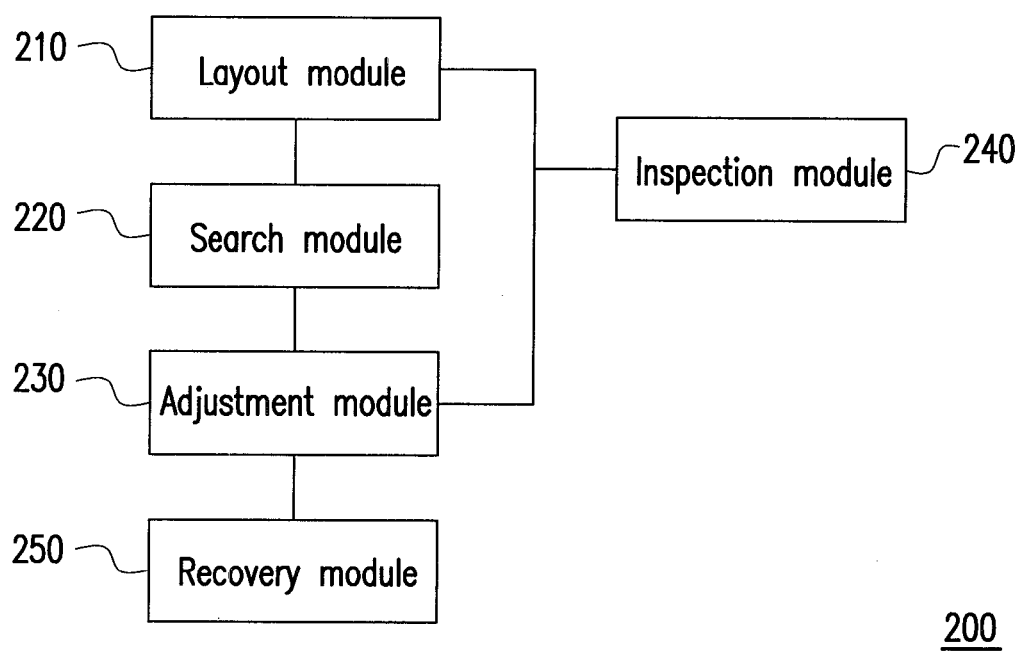
FIG. 2 is a block diagram of a short-circuit inspection device for a circuit layout according to an embodiment of the disclosure.
Figure 3:
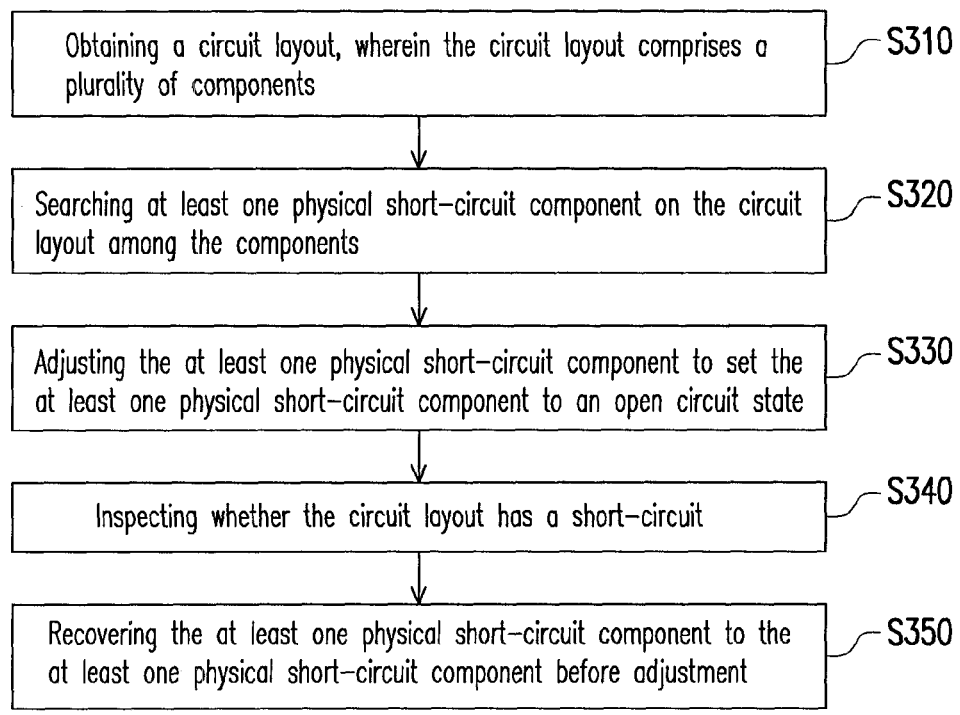
FIG. 3 is a flowchart illustrating a method for inspecting short-circuit of a circuit layout according to a first embodiment of the disclosure.

FIG. 2 is a block diagram of a short-circuit inspection device 200 for a circuit layout according to an embodiment of the disclosure, FIG. 3 is a flowchart illustrating a method for inspecting short-circuit of a circuit layout according to a first embodiment of the disclosure. Referring to FIG. 2, the short-circuit inspection device 200 includes a layout module 210, a search module 220, an adjustment module 230, an inspection module 240 and a recovery module 250. The short-circuit inspection device 200 is used to inspect whether a circuit layout has a physical short-circuit component (i.e. an actual short-circuit error) that is not intentionally configured by the designer, where such circuit layout can be used to produce a circuit board, and the circuit board is, for example, a general printed circuit board (PCB) or a flexible printed circuit board (FPCB), which is not limited by the disclosure.

Referring to FIG. 2 and FIG. 3, the layout module 210 obtains the circuit layout, where the circuit layout may include a plurality of components of different types, for example, electronic components such as resistors, capacitors, transistors or diodes, etc. (step S310). In the embodiments of the disclosure, the layout module 210 may also have a user interface, which facilitate the designer to increase, edit, load or erase the components or the circuit in the circuit layout.

The search module 220 is connected to the layout module 210, and searches at least one physical short-circuit component on the circuit layout among the components (step S320). Particularly, the at least one physical short-circuit component is generally a physical short-circuit component or a wire configured by the designer intentionally according to a special demand of the circuit layout, so that some circuits in the circuit layout present a short-circuit state, for example, a zero ohm resistor, an internal short-circuit component or a jumper, etc. The adjustment module 230 is connected to the search module 220, and adjusts the at least one physical short-circuit component to set the at least one physical short-circuit component to an open circuit state (step S330). In this way, in the subsequent short-circuit inspection, a situation that these the physical short-circuit component are inspected to have short-circuit errors is avoided. The inspection module 240 is connected to the layout module 210 and the adjustment module 230, and inspects whether the circuit layout has a short-circuit (step S340). The recovery module 250 is connected to the adjustment module 230, and recovers the at least one physical short-circuit component (i.e. the at least one physical short-circuit component adjusted to the open circuit state) to the at least one physical short-circuit component before adjustment (step S350).

In detail, after the layout module 210 obtains a circuit layout of a circuit board, the search module 220 can search at least one physical short-circuit component on the circuit layout through a plurality of approaches. For example, to facilitate a post maintenance operation of the circuit board, or make the circuit layout to be suitable for a plurality of versions, when the designer of the circuit layout designs a circuit layout containing some intentionally-configured physical short-circuit components (for example, the zero ohm resistors or internal short-circuit components, etc.) or wires, the designer generally records corresponding positions of the intentionally-configured physical short-circuit components in the circuit layout in a netlist. When the short-circuit inspection is performed on the circuit layout, the designer can inspect and skip the physical short-circuit components intentionally configured by the designer such as the zero ohm resistors or the internal short-circuit components according to the netlist, so as to find the actual short-circuit errors. Therefore, in an embodiment, the search module 220 can position positions of all of the physical short-circuit components intentionally configured by the designer in the circuit layout according to the netlist, and the adjustment module 230 respectively adjusts the physical short-circuit components on the corresponding positions to the open circuit state. Then, after the short-circuit inspection is completed, the recovery module 250 recovers the at least one physical short-circuit component adjusted to the open circuit state to the at least one physical short-circuit component before adjustment. In this way, when the designer performs the short-circuit inspection, a situation that the designer spend extra time to identify the actual short-circuit errors as the physical short-circuit components intentionally configured by the designer and the short-circuit errors that actually cause circuit abnormity are simultaneously inspected is avoided.

It should be noticed that the layout module 210, the search module 220, the adjustment module 230, the inspection module 240 and the recovery module 250 can be a hardware device, a circuit loop, a software program, firmware or a combination thereof, for example, a hardware device composed of logic circuit devices, which can respectively execute the above functions, or a software/firmware program stored in a hard disk or a memory of the short-circuit inspection device 200 of the circuit layout, which can be loaded to a processor of the short-circuit inspection device 200 of the circuit layout to respectively execute the above functions. In other words, those skilled in the art can correspondingly adjust the above implementations according to an actual application.

Figure 4:
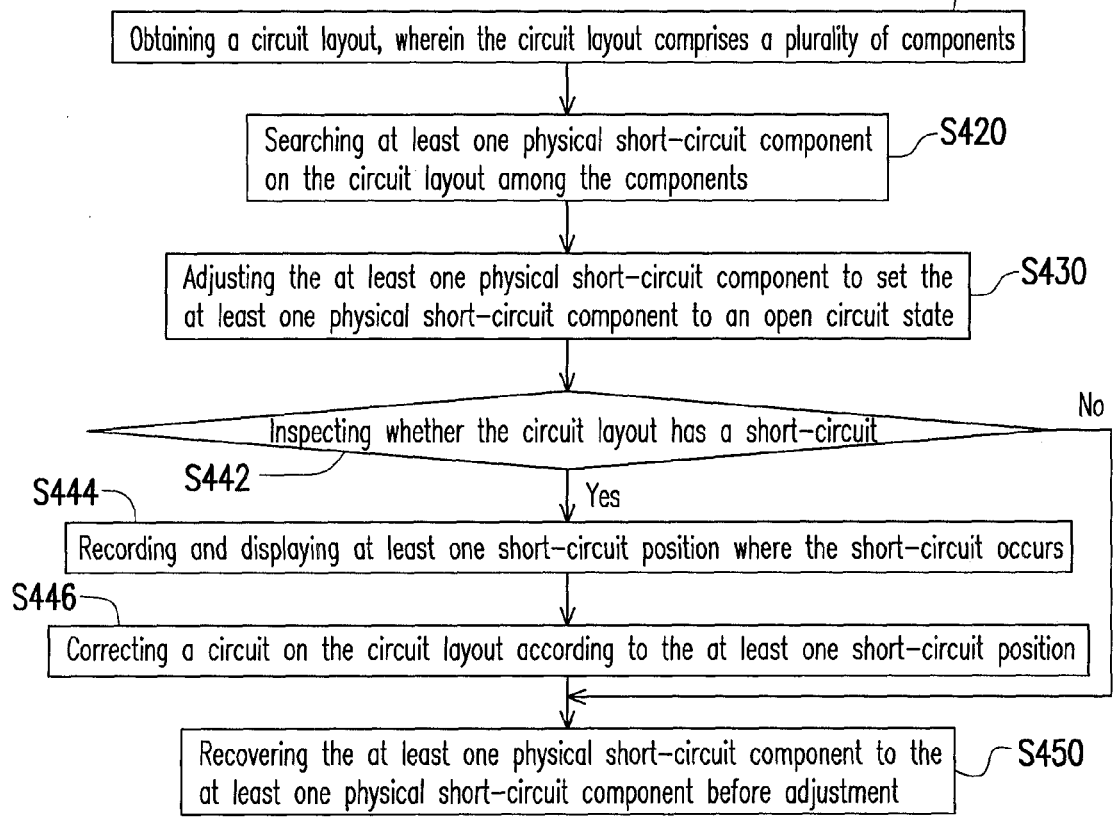
FIG. 4 is a flowchart illustrating a method for inspecting short-circuit of a circuit layout according to a second embodiment of the disclosure.

Further, FIG. 4 is a flowchart illustrating a method for inspecting short-circuit of a circuit layout according to a second embodiment of the disclosure. Referring to FIG. 2 and FIG. 4, similar to the first embodiment, the layout module 210 obtains the circuit layout, where the circuit layout includes a plurality of components (step S410). The search module 220 searches at least one physical short-circuit component on the circuit layout among the components, for example, the physical short-circuit components or wires such as the zero ohm resistors or the internal short-circuit components, etc. that are intentionally configured by the designer to present a short-circuit state of the circuit (step S420). The adjustment module 230 adjusts the at least one physical short-circuit component to the open circuit state (step S430). After the inspection module 240 inspects whether the circuit layout has a short-circuit (step S442), if the circuit layout still has a short-circuit, the inspection module 240 determines the short-circuit as an abnormal short-circuit (since all of the physical short-circuit components intentionally configured by the designer have been adjusted to the open circuit state in the step S430). Then, the inspection module 240 records and displays at least one short-circuit position where the short-circuit occurs (step S444), and the designer can correct a circuit on the circuit layout (i.e. a circuit having the short-circuit error) according to the at least one short-circuit position recorded by the inspection module 240 (step S446). In the present embodiment, the inspection module 240 can record the at least one short-circuit position in the netlist or other similar lists to facilitate the user correcting the errors according to the netlist. Moreover, after the short-circuit inspection is completed, the recovery module 250 recovers the at least one physical short-circuit component (i.e. the at least one physical short-circuit component adjusted to the open circuit state) to the at least one physical short-circuit component before adjustment (step S450).

Generally, if a circuit layout of a circuit board is relatively simple, the designer can use only one layer of a circuit pattern layer to implement the circuit layout of the circuit board, while if the circuit layout of the circuit board is relatively complicated, the designer can use two or three layers of the circuit pattern layer to implement the circuit layout of the circuit board. Based on the concept of multi layers of the pattern layer on the circuit layout, in an embodiment of the disclosure, an alternative pattern layer is configured at a corresponding position of the physical short-circuit component intentionally configured by the designer in the circuit pattern layer, and the alternative pattern layer and the circuit pattern layer are merged, and after the short-circuit inspection of the circuit layout is completed, the alternative pattern layer and the circuit pattern layer are separated. In this way, the physical short-circuit component intentionally configured by the designer can be adjusted to the open circuit state without actually changing a circuit layout on the circuit pattern layer.

Figure 5:
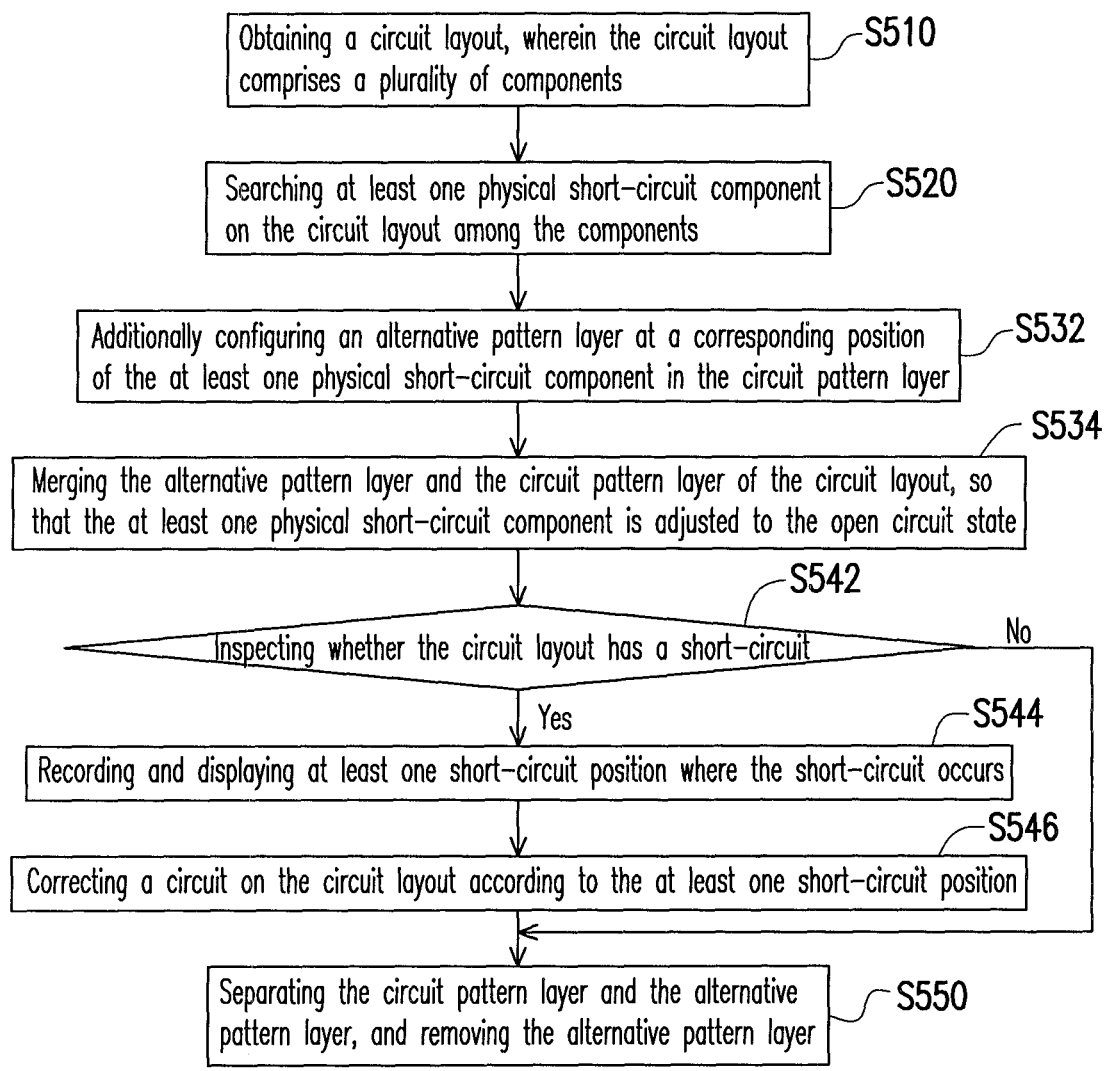
FIG. 5 is a flowchart illustrating a method for inspecting short-circuit of a circuit layout according to a third embodiment of the disclosure.

FIG. 5 is a flowchart illustrating a method for inspecting short-circuit of a circuit layout according to a third embodiment of the disclosure. Referring to FIG. 2 and FIG. 5, the layout module 210 obtains the circuit layout, where the circuit layout includes a circuit pattern layer and a plurality of components (step S510), where the circuit pattern layer can be a single layer or multi-layer circuit pattern layer. The search module 220 searches at least one physical short-circuit component on the circuit layout among the components, for example, the physical short-circuit components or wires such as the zero ohm resistors or the internal short-circuit components, etc. that are intentionally configured by the designer to present a short-circuit state of the circuit (step S520). The adjustment module 230 additionally configures an alternative pattern layer at a corresponding position of the at least one physical short-circuit component in the circuit pattern layer (S532), and merges the alternative pattern layer and the circuit pattern layer of the circuit layout, so that the at least one physical short-circuit component is adjusted to the open circuit state (step S534).

Figure 6A:
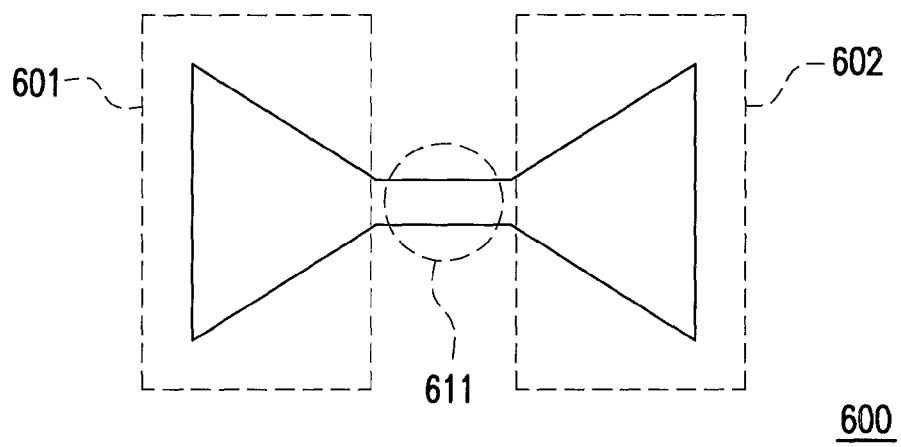
FIG. 6A, FIG. 6B and FIG. 6C are schematic diagrams of using an alternative pattern layer to adjust a physical short-circuit component to an open circuit state according to an embodiment of the disclosure.
Figure 6B:
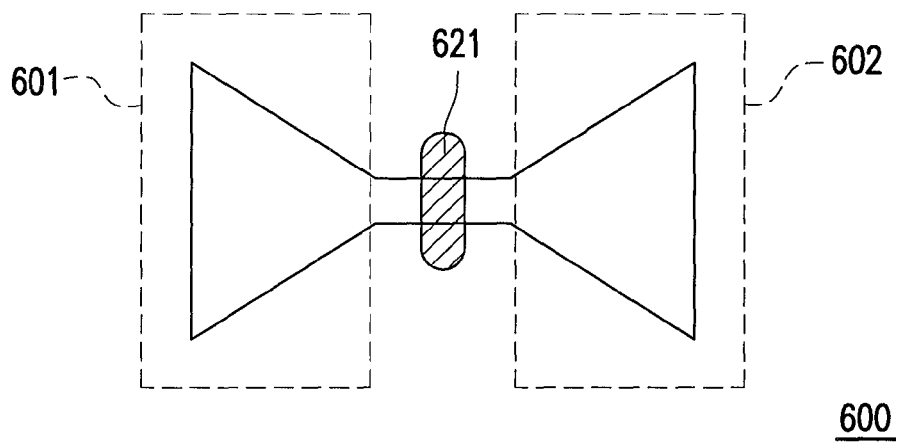
Figure 6C:
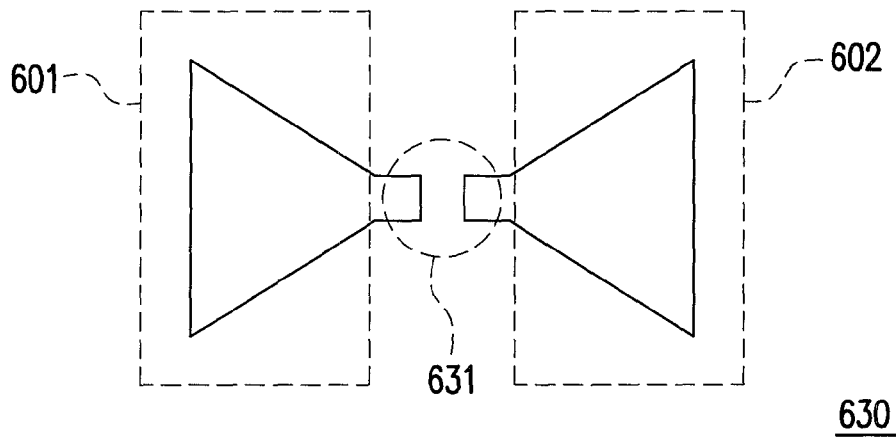

For example, FIG. 6A, FIG. 6B and FIG. 6C are schematic diagrams of using an alternative pattern layer to adjust a physical short-circuit component 600 to the open circuit state according to the third embodiment of the disclosure. Referring to FIG. 6A, in a circuit pattern layer of an exemplary circuit layout, a component endpoint 601 and a component endpoint 602 are located on the circuit pattern layer and are marked as two endpoints of the physical short-circuit component 600. The component endpoint 601 and the component endpoint 602 are connected to present a short-circuit state through a short-circuit line (marked by a dot line 611) intentionally configured by the designer.

Referring to FIG. 6B, an alternative pattern layer 621 is configured at the corresponding position of the physical short-circuit component 600 in the circuit pattern layer, so as to break a line conducted between the component endpoint 601 and the component endpoint 602. In the present embodiment, a line segment is used to implement the alternative pattern layer 621, though the disclosure is not limited thereto, and those skilled in the art can use the alternative pattern layer 621 of other shapes as long as the line conducted between the component endpoint 601 and the component endpoint 602 is broken.

Referring to FIG. 6C, after the alternative pattern layer 621 and the circuit pattern layer are merged, the physical short-circuit component 600 is adjusted to an open circuit component 630 (i.e. the line between the component endpoint 601 and the component endpoint 602 has an open circuit state, shown as a dot line 631), so that a subsequent short-circuit inspection procedure can directly skip the intentionally-configured open circuit component 630.

Referring to FIG. 2 and FIG. 5, after the inspection module 240 inspects whether the circuit layout has a short-circuit (step S542), if the circuit layout still has a short-circuit, the inspection module 240 determines the short-circuit as an abnormal short-circuit (since all of the physical short-circuit components intentionally configured by the designer have been adjusted to the open circuit state in the step S534). Then, the inspection module 240 records and displays at least one short-circuit position where the short-circuit occurs (step S544), and the designer can correct the circuit on the circuit layout according to the at least one short-circuit position recorded by the inspection module 240 (step S546). Moreover, after the short-circuit inspection is completed, the recovery module 250 separates the circuit pattern layer and the alternative pattern layer, and removes the alternative pattern layer (for example, removes the alternative pattern layer 621 shown in FIGS. 6B-6C), so as to recover the at least one physical short-circuit component to the at least one physical short-circuit component before adjustment (step S550), for example, recover the open circuit component 630 of FIG. 6C to the physical short-circuit component 600 of FIG. 6A. In this way, the short-circuit errors required to be corrected can be effectively inspected without any change in the circuit pattern layer.

According to another aspect, besides recording the corresponding positions of the physical short-circuit components or wires intentionally configured by the designer in the circuit layout, the netlist also records the corresponding positions of the physical short-circuit components or wires replaced by the open circuit components (for example, the open circuit component 630 of FIG. 6C).

Figure 7:
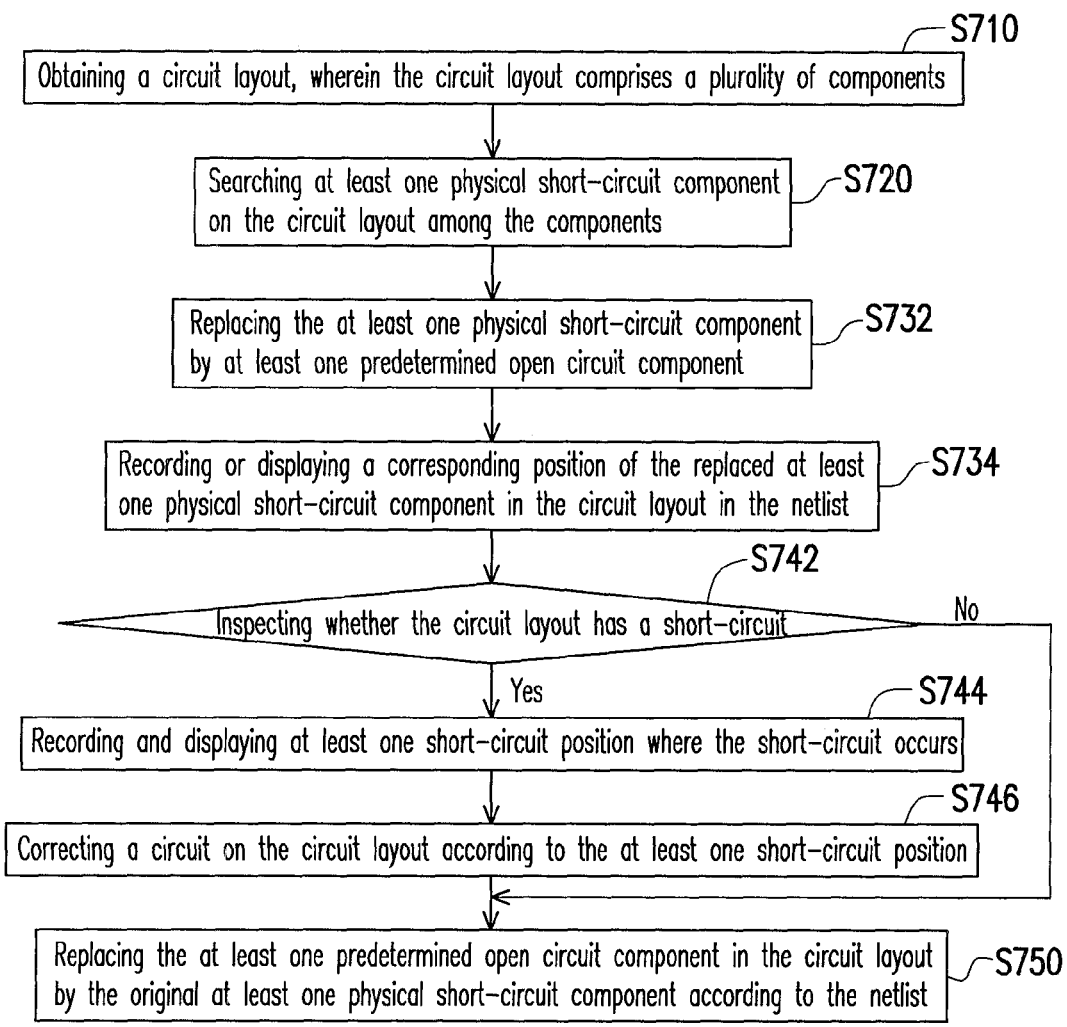
FIG. 7 is a flowchart illustrating a method for inspecting short-circuit of a circuit layout according to a fourth embodiment of the disclosure.

FIG. 7 is a flowchart illustrating a method for inspecting short-circuit of a circuit layout according to a fourth embodiment of the disclosure. Referring to FIG. 2 and FIG. 7, the layout module 210 obtains the circuit layout, where the circuit layout includes a plurality of components (step S710). The search module 220 searches at least one physical short-circuit component on the circuit layout among the components, for example, the physical short-circuit components or wires such as the zero ohm resistors or the internal short-circuit components, etc. that are intentionally configured by the designer to present a short-circuit state of the circuit (step S720). The adjustment module 230 replaces the at least one physical short-circuit component by at least one predetermined open circuit component (for example, the open circuit component 630 of FIG. 6C) (step S732), and records or displays a corresponding position of the replaced at least one physical short-circuit component in the circuit layout in the netlist (S734). After the inspection module 240 inspects whether the circuit layout has a short-circuit (step S742), if the circuit layout still has a short-circuit, the inspection module 240 determines the short-circuit as an abnormal short-circuit (since all of the physical short-circuit components intentionally configured by the designer have been replaced by the predetermined open circuit components in the step S732). Then, the inspection module 240 records and displays at least one short-circuit position where the short-circuit occurs (step S744), and the designer can correct the circuit on the circuit layout according to the at least one short-circuit position recorded by the inspection module 240 (step S746). Moreover, after the short-circuit inspection is completed, the recovery module 250 replaces the at least one predetermined open circuit component in the circuit layout by the original at least one physical short-circuit component according to the netlist (step S750). In this way, after the short-circuit inspection and correction of the short-circuit errors are completed, according to the record of the netlist, the physical short-circuit component replaced by the predetermined open circuit component can be quickly recovered to the original physical short-circuit component.

Figure 8:
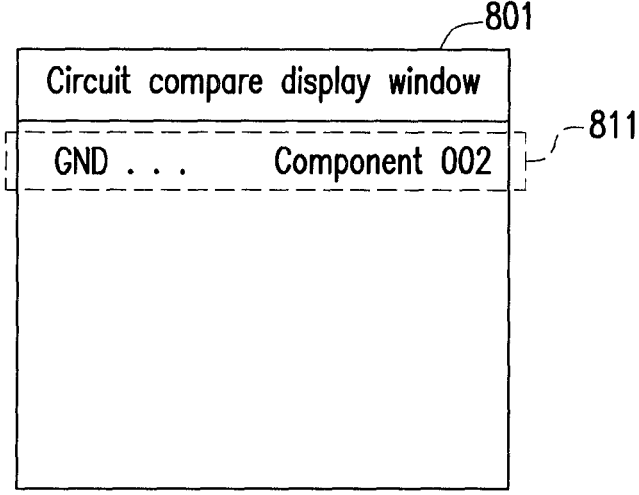
FIG. 8 is a schematic diagram of a short-circuit inspection result according to an embodiment of the disclosure.

In order to clearly highlight an effect of the method for inspecting short-circuit of the circuit layout of the present disclosure, another embodiment is provided for descriptions. FIG. 8 is a schematic diagram of a short-circuit inspection result according to an embodiment of the disclosure. In the present embodiment, after physical short-circuit components of a circuit layout according to a design requirement are adjusted to the open circuit state, the designer can inspect a short-circuit status of the circuit layout through short-circuit inspection software (for example, vSure).

Figure 1:
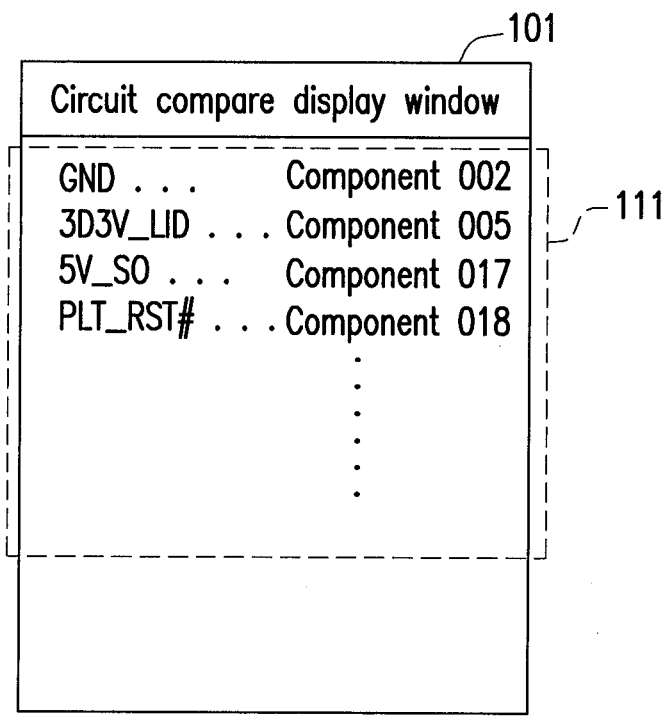
FIG. 1 is a schematic diagram of an inspection result obtained by inspecting short-circuit of a circuit layout through short-circuit inspection software.

Referring to FIG. 8, as the physical short-circuit components intentionally configured by the designer according to the design requirement have been all adjusted to the open circuit state in advance, an abnormal short-circuit record 811 in a short-circuit inspection result window 801 generated by the short-circuit inspection software only has one short-circuit message (i.e. an actual short-circuit error). Therefore, the designer can direct determine such short-circuit message to be the short-circuit error and correct the corresponding component, and then recovers the adjusted physical short-circuit components to the physical short-circuit components before adjustment to complete the short-circuit inspection and error correction. Compared to the short-circuit inspection result window 101 of FIG. 1, the designer has to find the actual short-circuit errors from a large amount of the abnormal short-circuit record 111, which leads to a waste of time.

In summary, in the method for inspecting short-circuit of the circuit layout and the device using the same, the circuit layout is obtained, the physical short-circuit components on the obtained circuit layout are searched, and the physical short-circuit components intentionally configured by the designer are adjusted to the open circuit state, so that when it is inspected whether the circuit layout has the short-circuit, the adjusted physical short-circuit components are not regarded as the short-circuit errors, so as to improve accuracy for inspecting the short-circuit error. After the short-circuit inspection, the adjusted physical short-circuit components are recovered to the physical short-circuit components before the adjustment. In this way, the inspected short-circuit errors do not include the physical short-circuit components intentionally configured by the designer, so that a time required for again identifying the actual short-circuit errors from the inspection result is reduced, and efficiency and accuracy in short-circuit inspection are greatly improved.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A method for inspecting short-circuit of a circuit layout for producing a circuit board and reducing a misidentification of a short-circuit error corresponding to an intentionally configured short-circuit component, comprising:
    obtaining, by a short-circuit inspection device, the circuit layout, wherein the circuit layout comprises a plurality of components;
    searching, by the short-circuit inspection device, at least one physical short-circuit component on the circuit layout among the components;
    adjusting, by the short-circuit inspection device, the at least one physical short-circuit component to set the at least one physical short-circuit component to an open circuit state;
    performing a short-circuit inspection procedure, by the short-circuit inspection device, to inspect whether the circuit layout comprising the at least one physical short-circuit component adjusted to be in the open circuit state has a short-circuit; and
    after the short-circuit inspection procedure is performed, recovering, by the short-circuit inspection device, the at least one physical short-circuit component adjusted to be in the open circuit state to the at least one physical short-circuit component before adjustment.

2. The method for inspecting short-circuit of the circuit layout as claimed in claim 1, wherein the circuit layout further comprises a circuit pattern layer, and
    the step of adjusting the at least one physical short-circuit component to set the at least one physical short-circuit component to the open circuit state comprises:
    additionally configuring an alternative pattern layer at a corresponding position of the at least one physical short-circuit component in the circuit pattern layer; and
    merging the circuit pattern layer and the alternative pattern layer of the circuit layout to set the at least one physical short-circuit component to the open circuit state.

3. The method for inspecting short-circuit of the circuit layout as claimed in claim 2, wherein the step of recovering the at least one physical short-circuit component adjusted to be in the open circuit state to the at least one physical short-circuit component before adjustment comprises:
    separating the circuit pattern layer and the alternative pattern layer, and removing the alternative pattern layer.

4. The method for inspecting short-circuit of the circuit layout as claimed in claim 1, wherein the step of adjusting the at least one physical short-circuit component to set the at least one physical short-circuit component to the open circuit state comprises:
    replacing the at least one physical short-circuit component by at least one predetermined open circuit component.

5. The method for inspecting short-circuit of the circuit layout as claimed in claim 4, wherein the step of adjusting the at least one physical short-circuit component to set the at least one physical short-circuit component to the open circuit state comprises:
    recording or displaying a corresponding position of the replaced at least one physical short-circuit component in the circuit layout in a netlist.

6. The method for inspecting short-circuit of the circuit layout as claimed in claim 5, wherein the step of recovering the at least one physical short-circuit component adjusted to be in the open circuit state to the at least one physical short-circuit component before adjustment comprises:
    replacing the at least one predetermined open circuit component in the circuit layout by the original at least one physical short-circuit component according to the netlist.

7. The method for inspecting short-circuit of the circuit layout as claimed in claim 1, wherein the step of performing the short-circuit inspection procedure comprises:
    recording and displaying at least one short-circuit position where the short-circuit occurs.

8. The method for inspecting short-circuit of the circuit layout as claimed in claim 7, wherein the step of performing the short-circuit inspection procedure further comprises:
    correcting a circuit of the circuit layout according to the at least one short-circuit position.

9. The method for inspecting short-circuit of the circuit layout as claimed in claim 1, wherein the circuit board is a printed circuit board or a flexible printed circuit board.

10. A short-circuit inspection device for a circuit layout for producing a circuit board and reducing a misidentification of a short-circuit error corresponding to an intentionally configured short-circuit component, comprising a plurality of program instructions and a processor, wherein the program instructions are loaded into the processor to performing the following operations:
    obtaining the circuit layout, wherein the circuit layout comprises a plurality of components;
    searching at least one physical short-circuit component on the circuit layout among the components;
    adjusting the at least one physical short-circuit component to set the at least one physical short-circuit component to an open circuit state;
    performing, a short-circuit inspection procedure to inspect whether the circuit layout comprising the at least one physical short-circuit component adjusted to be in the open circuit state has a short-circuit; and
    after the short-circuit inspection procedure is performed, recovering the at least one physical short-circuit component adjusted to be in the open circuit state to the at least one physical short-circuit component before adjustment.

11. The short-circuit inspection device for the circuit layout as claimed in claim 10, wherein the circuit layout further comprises a circuit pattern layer, and wherein the operation of adjusting the at least one physical short-circuit component to set the at least one physical short-circuit component to the open circuit state comprises:
additionally configuring an alternative pattern layer at a corresponding position of the at least one physical short-circuit component in the circuit pattern layer, and
merging the circuit pattern layer and the alternative pattern layer of the circuit layout to set the at least one physical short-circuit component to the open circuit state.

12. The short-circuit inspection device for the circuit layout as claimed in claim 11, wherein the operation of recovering the at least one physical short-circuit component adjusted to be in the open circuit state to the at least one physical short-circuit component before adjustment comprises:
separating the circuit pattern layer and the alternative pattern layer, and removing the alternative pattern layer.

13. The short-circuit inspection device for the circuit layout as claimed in claim 10, wherein the operation of adjusting the at least one physical short-circuit component to set the at least one physical short-circuit component to the open circuit state comprises:
replacing the at least one physical short-circuit component by at least one predetermined open circuit component.

14. The short-circuit inspection device for the circuit layout as claimed in claim 13, wherein the step of adjusting the at least one physical short-circuit component to set the at least one physical short-circuit component to the open circuit state comprises:
recording and displaying a corresponding position of the replaced at least one physical short-circuit component in the circuit layout in a netlist.

15. The short-circuit inspection device for the circuit layout as claimed in claim 14, wherein the operation of recovering the at least one physical short-circuit component adjusted to be in the open circuit state to the at least one physical short-circuit component before adjustment comprises:
replacing the at least one predetermined open circuit component in the circuit layout by the original at least one physical short-circuit component according to the netlist.

16. The short-circuit inspection device for the circuit layout as claimed in claim 10, wherein the operation of performing the short-circuit inspection procedure comprises:
recording and displaying at least one short-circuit position where the short-circuit occurs.

17. The short-circuit inspection device for the circuit layout as claimed in claim 16, wherein the operation of performing the short-circuit inspection procedure further comprises:
correcting a circuit of the circuit layout according to the at least one short-circuit position.

18. The short-circuit inspection device for the circuit layout as claimed in claim 10,
wherein the circuit board is a printed circuit board or a flexible printed circuit board.

* * * * *